United States Patent
Wen et al.

(10) Patent No.: US 8,137,721 B2
(45) Date of Patent: Mar. 20, 2012

(54) INK JETTING INKS FOR FOOD APPLICATION

(75) Inventors: LuFang Wen, Mason, OH (US); David Arthur Lanner, Cincinnati, OH (US); Peter Yau Tak Lin, Liberty, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1399 days.

(21) Appl. No.: 11/201,522

(22) Filed: Aug. 11, 2005

(65) Prior Publication Data
US 2006/0038866 A1    Feb. 23, 2006

Related U.S. Application Data

(60) Provisional application No. 60/602,476, filed on Aug. 18, 2004.

(51) Int. Cl.
*B41J 2/00* (2006.01)
(52) U.S. Cl. .......................................... 426/383; 426/87
(58) Field of Classification Search .................. 426/250, 426/87, 383; 347/105, 101, 87; 101/483; *B41J 2/00*
See application file for complete search history.

(56) References Cited

U.S. PATENT DOCUMENTS

| | | | |
|---|---|---|---|
| 5,162,119 A | 11/1992 | Pappas et al. | |
| 5,534,281 A | 7/1996 | Pappas et al. | |
| 5,711,791 A * | 1/1998 | Croker et al. | 106/31.35 |
| 5,800,601 A * | 9/1998 | Zou et al. | 106/31.65 |
| 2001/0046535 A1* | 11/2001 | Bowling | 426/87 |
| 2003/0231226 A1 | 12/2003 | Ishikawa et al. | |
| 2004/0021757 A1* | 2/2004 | Shastry et al. | 347/106 |
| 2004/0050289 A1 | 3/2004 | Russell et al. | |
| 2004/0061753 A1 | 4/2004 | Chen et al. | |
| 2004/0086603 A1* | 5/2004 | Shastry et al. | 426/104 |
| 2005/0003055 A1* | 1/2005 | Baydo et al. | 426/383 |
| 2005/0058753 A1* | 3/2005 | Romanach | 426/383 |
| 2006/0034984 A1* | 2/2006 | Baydo et al. | 426/250 |

FOREIGN PATENT DOCUMENTS

EP            1 403 343          12/2005

OTHER PUBLICATIONS

PCT International Preliminary Report on Patentability and Search Report, PCT/US2005/029343, 9 pages.

* cited by examiner

*Primary Examiner* — Steven Leff
(74) *Attorney, Agent, or Firm* — S. Robert Chuey; Roddy M. Bullock; Adam W. Borgman

(57) ABSTRACT

Edible ink formulations for printing onto edible substrates and snack pieces. Methods are provided showing how to print on edible substrates and on snack pieces at high line speeds.

11 Claims, 3 Drawing Sheets

INK JETTING INKS FOR FOOD APPLICATION

CROSS REFERENCE TO RELATED APPLICATIONS

This application claims the benefit of priority to U.S. Provisional Application Ser. No. 60/602,476, filed Aug. 18, 2004, which is herein incorporated by reference.

FIELD OF THE INVENTION

The invention herein provides a method for printing discernible/readable text/images on snack chips, comprising an edible colorant, a carrier for the colorant (e.g., propylene glycol) and at least one kind of edible surfactant. Preferably, the ink compositions herein contain both a food edible colorant dye and one or more types of edible surfactant.

BACKGROUND

The decoration of foods with food colorings is common practice to enhance the visual aesthetics of comestibles. The complexity and intricacy of such decorations has increased recently with the introduction of ink jet systems to foods. One example is the use of such systems for decoration of bakery items like cakes, wherein a consumer can have a picture of her choice imprinted on rice paper and put it on the icing of the cake.

Up until recently, the ink jet system has been considered slow for the production of high volume production articles like sheeted dough's and snacks. Russell et al., Mar. 18, 2004, Printing Process With Edible Inks, U.S. 2004/0050289A1, for example, favors a lithographic printing for high volume food articles. Others have also used rotary printing devices. For example, in U.S. Pat. No. 5,534,281, issued Jul. 9, 1996, and U.S. Pat. No. 5,162,119, issued Nov. 10, 1992, both to Pappas et al, it is disclosed the use of a rotary printer to print images onto a dough substrate.

These systems, however, are physically limited in the number of images they could print. A rotary printer, for example, has embossed images in the limited surface area of the roll. Once a revolution of the roll has been completed, the same images will be printed again in a subsequent revolution. Since consumers are constantly looking for variety, such systems would be unsatisfactory. These systems also have the disadvantage of direct contact of the printing equipment with the food substrate, which can create sanitation, reliability and quality issues, and create problems when attempting to register multiple colors. Furthermore, challenges are created when printing to fragile substrates or media like fabricated snack chips, cookies, crisps or crackers.

The jetting frequencies at which an inkjet print head can repeatedly jet ink from a nozzle are a function of the specific inkjet technology upon which the print head is based and the ink properties used in such print heads. Drop-on-demand piezoelectric inkjet (DOD-PIJ) is a specific technology that is particularly suitable for the printing of high volume foods, however, its jetting frequency so far has been limited to a maximum ink jet frequency of about 20 KHz (thousands of drops per second). Also, the profile of droplet characteristics (e.g., velocity, satellite, ligament, size, mass, and shape) as a function of jetting frequency for conventional inks limits the operating window throughout the jetting frequency spectrum that would be encountered upon printing for consistent printing quality and reliable jetting performance of different images. A modification of ink to provide a consistent droplet characteristic would be valuable for improving printing image quality.

Satellite drop formation (i.e., the occurrence of one or more undesirable droplets formed next to or in close proximity to primary drops, each originating from the same ink jet nozzle) has been seen for conventional inks that cause unrecognizable images, severe blurring, poor readability and serious reduction in jetting reliability. Thus, such satellite drop formation is undesirable and must be limited.

Unlike thermal bubble jet ink which uses water as a main component of edible inks, the level of water content in piezoelectric printers is vastly limited due to the considerations of water interaction with electrical field and water weakening of the bonding adhesive used. It would therefore be advantageous to develop inks for use with DOD-PIJ print heads to print on food substrates at high speed with readable text and/or images since such inkjet system is not constrained to a maximum number of different text and/or images by the equipment and since contact of the printing equipment and the food substrate is avoided. It would also be advantageous to develop inks with consistent droplet size and velocity across the spectrum of jetting frequencies up to 150 kHz. Furthermore, it would be advantageous to make these inks compatible with a food process to enable retention of high quality, readable images even after subjecting the printed substrate to further processing like high-temperature baking or frying.

SUMMARY

Accordingly, the invention herein provides a method for printing discernible/readable text/images on snack chips, comprising a food edible colorant, a carrier for the colorant (e.g., propylene glycol) and at least one kind of edible surfactant. The ink compositions herein contain both a food edible colorant and at least one type of edible surfactant.

Included herein is a method for printing readable/discernible images onto a high-speed processing line (>50 feet/minute), comprising a) positioning an edible substrate onto a high speed processing line; b) delivering the substrate to an ink jet printing station; and c) printing an ink containing surfactant from one or more piezo-electric drop-on-demand printers located within the printing station onto the substrate. Additionally, further steps include d) delivering the printed substrate to a high temperature cooking device; and e) cooking the printed substrate. Again, the edible ink herein contains at least one edible surfactant and optionally two or more types of surfactant. Preferably, the edible ink provides less than about 50% of the printed surface area to be a result of satellite formation for a given edible surface (e.g., edible substrate, snack chip). More preferably, the edible ink provides less than about 25% of the printed surface area to be a result of satellite formation for a given edible surface. Most preferably, the edible ink provides less than about 5% of the printed surface area to be a result of satellite formation for a given edible surface.

BRIEF DESCRIPTION OF THE DRAWINGS

While the present application concludes with claims that distinctly define the present invention, it is believed that this invention will be better understood with reference to the drawings wherein:

DETAILED DESCRIPTION

Figure 1:
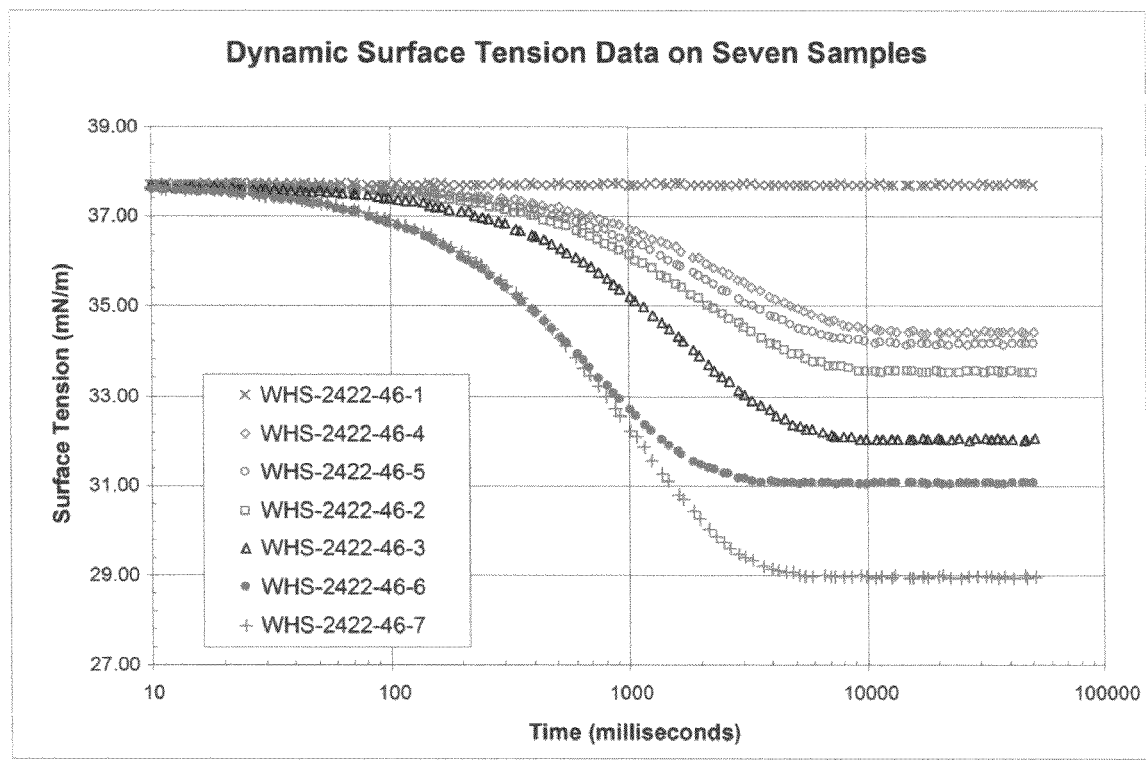
FIG. 1 is a graphical representation of the dynamic surface tension over time of certain ink formulations according to the present invention compared to one control formulation.

Various publications and patents are referenced throughout this disclosure. All references cited herein are hereby incorporated by reference. All component or composition levels are in reference to the active level of that component or composition, and are exclusive of impurities, for example, residual solvents or by-products, which may be present in commercially available sources.

Referred to herein are trade names for components including various ingredients utilized in the present invention. The inventors herein do not intend to be limited by materials under a certain trade name. Equivalent materials (e.g., those obtained from a different source under a different name or catalog number) to those referenced by trade name may be substituted and utilized in the compositions, kits, and methods herein.

By the term "colorant" it is meant herein a composition comprising dye, pigment, natural colorants and mixtures thereof.

By the term "images" it is meant herein all pictorial representations that show an image in the traditional sense as well as all forms of text in all known or created languages and in all possible fonts and sizes of lettering.

By the term "readable" or "discernible" images it is meant herein printed images and/or text that is easily readable and discernible with the naked eye, that have no significant smudging, satellite formation, double images, missing dots, etc.

By the term "dye" it is meant herein one or more of the colorants used in all types of ink.

By the term "meniscus" it is meant herein the interface of a liquid to its container. It is caused by the degree of attraction a liquid has to the material of the container. The surface tension of the liquid is the major contributor to the shape and stability of this interface.

By the term "nozzle" it is meant herein the area in some inkjet systems that direct the flow of ink immediately before the opening or orifice of the print head. It acts as a channel for the ink to use as it leaves the reservoir.

By the term "piezo" or "piezo electric" it is meant herein a Piezoelectric Ceramic Crystal. This material has the ability to expand and contract with the application of electric current.

By the term "satellite" it is meant herein an extraneous dot of ink that travels away from the primary drop as it is shot from an inkjet nozzle. They are called satellites because they travel along with the primary drop of ink and are placed on substrate as a secondary droplet.

By the term "surfactant" it is meant herein a material added to an ink to adjust the ink properties (e.g., viscosity, contact angle, wetting, and surface tension).

In one embodiment herein, a method for ink jet printing readable/discernible images onto a high-speed processing line comprises positioning an edible substrate onto a high speed processing line, delivering the substrate to an ink jet printing station, and printing from one or more ink jet printers located within the printing station onto the substrate. Furthermore, the edible substrate is moved from the printing station to a high temperature heating device (e.g., a fryer) where the substrate, or individual cut portions of the substrate, are fried or baked.

The decoration of high volume of foods with ink jet systems presents a number of challenges since many requirements must be satisfied both to enable ink jet printing on edible substrates, ink jet printing on high speed processing lines (e.g., 50 feet per minute or greater), ink compositions compatible both with an edible substrate and with the process parameters necessary to print, and to produce the desired printed images and/or text that is easily readable and discernible with the naked eye without significant smudging, satellite formation, double images, missing dots, and that does not provide undesirable taste or smell.

In one embodiment of the present invention there is provided an ink comprising a non-aqueous based carrier, a surfactant and at least one active ingredient selected from the group consisting of a colorant, a flavor, a perfume, sugar, amino acid, protein and mixtures thereof. Preferably the ink is printed onto a substrate on a high speed processing line via one or more piezo-electric drop-on-demand printers. The surfactant is preferably selected from the group consisting of polysorbate based surfactants, lecithin based surfactants, sorbitan based surfactants and mixtures thereof, comprises less than about 50%, preferably, less than about 30%, even more preferably less than about 10% and most preferably less than about 5%, by weight oil and are preferably lecithin based. The melting point of the surfactants is preferred to be less than 70 C, more preferably less than 50 C, most preferably less than 40 C to keep the ink flowable at room temperature. The inks herein may further comprise a viscosity modifier, e.g., glycerin, and less than about 50%, preferably, less than about 30%, even more preferably less than about 10% and most preferably less than about 5%, by weight water, and the non-aqueous based carrier comprises a glycol based liquid. The inks of this invention are preferably edible as are the substrates they are printed on.

It is important that the ink used in the ink jet printer(s) 1) offer efficient printing onto the substrate, 2) that the ink is highly compatible with the internal mechanics and materials of the ink jet printer(s), 3) be able to be used in high-speed processing without significant (if any) clogging of the machinery in which it is used, 4) set and dry quickly on the substrate without smudging and smearing of the images, and 5) create consistently discernible and readable images and/or text from the moment of actual printing, through the high-temperature heating phase and when packaged, through travel to a marketing venue, to a consumer's home. In other words, the images and/or text printed herein will substantially be the same images and/or text shown from their first printing to their ultimate point of consumption.

Preferably, the high speed processing lines herein operate at speeds of 50 feet per minute or higher. The DPI (dots per inch) of printing capability herein ranges from about 50 to about 1200. The ink(s) used herein will comprise edible surfactant or edible surfactant-based materials.

The edible inks of the present invention may also comprise other optional materials to further enhance the performance of the ink. These materials include thickeners, anti-foamers, and anti-microbial agents. A thickener that could be used with the present invention is Glycerin. This material helps to increase viscosity and serves as a humectant to avoid drying out of the ink exposed at the open nozzle. It could be used in the range of about 0 to about 50% of the ink composition. An anti-foamer that could be used with the present invention could be Iso-Propyl Alcohol (IPA). This material serves to better clean the nozzles upon droplet ejection, to maintain straighter jets, as an anti-foamer, to improve wetting, and to reduce viscosity. It could be used up to about 2% of the ink composition. Higher levels may be used in accordance with regulatory limits in various countries. Other short chain alcohols like ethanol or butanol may be used as antifoamers. Anti-microbial agents that could be used with the inks of the present invention include Methyl Paraben and Propyl Paraben. Iso-Propyl Alcohol (IPA) and Propylene Glycol (PG) (and optionally ethanol) also exhibit some level of anti-microbial activity.

The addition of the edible surfactant further enables the use of higher dye concentrations in the ink to increase the color intensity, from otherwise low color intensity due to the limitation of dye solubility in the ink base.

The surfactants of the present invention also decrease the setting time of the ink on the edible substrates. This is important if the edible substrate is to undergo further processing like a heating step (e.g., frying or baking) that may smear or render the image less readable if the ink is not set on the surface prior to that step. If the ink does not set quickly enough, then the print head may need to be located further away from the subsequent step which may be inconvenient. This problem can be compounded if multiple colors are being printed on the substrate that may require a longer time to set if more ink is used than in a single color application.

The contact angle is one measure we can use to determine how quickly the ink sets up on the substrate. The contact angle measures the angle of the one droplet against the substrate at the point of contact. Over time, the contact angle changes because the droplet spreads over the substrate surface and/or is absorbed into the substrate.

Specific surfactants varying in their structure and properties that could be used with the present invention include but are not limited to synthetic surfactants, natural surfactants that are isolated and/or purified and modifications of natural surfactants. Synthetic surfactants include but are not limited to] diacetyl tartrate esters of monoglycerides [DATEM], acetylated monoglyceride [AcMG], lactylated monoglyceride [LacMG], and propylene glycol monoester [PGME]), sorbitan derivatives (e.g., sorbitan monostearate, sorbitan monooleate and sorbitan tristearate), polyhydric emulsifiers (e.g., sucrose esters and polyglycerol esters like polyoxyethylene (20) sorbitan monostearate [Polysorbate 60], polyoxyethylene (20) sorbitan tristearate [Polysorbate 65], and polyglycerol monostearate. 'Ryoto Sugar Ester' (sucrose fatty acid esters) and 'Ryoto Polyglycerol Ester' (polyglycerol fatty acid esters) are also acceptable surfactants for use herein. Both are safe and excellent emulsifiers/surfactants, and are used in a wide range of food applications. 'Ryoto Sugar Ester' is manufactured from natural sucrose and fatty acid esters of vegetable origin, and 'Ryoto Polyglycerol Ester' is made from natural glycerol and fatty acids of vegetable origin. Additional surfactants suitable for use in the present invention include anionic emulsifiers (e.g., sodium stearoyl lactylate [SSL], sodium stearyl fumarate, and sodium dodecyl sulfate [SDS]). Natural surfactants include but are not limited to lecithin which comprises surface active components phosphatidylethanoalamine (PE), phosphatidylinositol (PI), and phosphatidylcholine (PC). PC and PE are amphoteric surfactant species that can be either cationic N+) or anionic (P=O—) depending upon the pH of the solution. PI is an anionic surfactant that carries a negative charge on the active portion of the molecule (P—O—). Lecithin typically also comprises triglycerides. Low triglyceride lecithins are preferred as triglycerides can separate from the ink solution. The amount of lecithins added are preferably less than about 30% by, more preferably less than about 20%, and even more preferably less than about 10% and most preferably less than about 5% by weight. Modified natural surfactants include but are not limited to lysolecithin (enzyme modified) and acetylated lecithin.

The selection of a specific surfactant for a particular ink is a function of its dispersability in ink, its impact on surface tension over the limited time that ink is ejected from the nozzle until a droplet is formed, its impact on ink viscoelasticity, viscosity and ability to maintain an ink in liquid state at room temperature (about 25 C).

Some surfactants like lecithin can provide dispersability challenges. The dispersability is important to avoid separation of the surfactant from the ink solution and prevent blockage of the print head nozzles. Lecithins in liquid or solid form are preferred versus granular types.

Surface tension of an ink is a critical parameter to enable proper jetting and to form uniform droplets upon ejection of ink from the nozzle. There is typically a variety of colorant carrier materials that can be used for a non-edible applications with varying surface tension characteristics. Such large variety does not exist for edible inks in the context of DOD-PIJ. In fact, propylene glycol is one of the few ingredients meeting the basic requirements for surface tension, viscosity, and approval for current use in foods. Propylene glycol, however, exhibits a surface tension of about 40 dyne/cm, which is on the high end of the preferred surface tension window for inks for use in DOD-PIJ. This higher surface tension is a key reason for the need of the use of surfactants for the invention herein.

One consideration in this respect is the speed at which a surfactant can act to lower the surface tension. The surface tension is constantly changing as the ink is ejected from the nozzle and as ink splits into droplets since these processes are also creating new surfaces (e.g., interface) between the ink droplet and the surrounding environment (e.g., air). Since the time it takes to eject ink and form a droplet is so small, there is hardly enough time to reach the equilibrium surface tension and we must consider the dynamics of the process.

For this reason, and given that different components of the ink will take different amount of time to reposition themselves on the new surface, the speed at which the surfactant can reposition itself on that new surface is very important. A high speed can, therefore, enable a surfactant to lower the surface tension in time for the proper formation of the ink droplets. FIG. 1 shows a plot of the surface tension (in mN/m or dyne/cm) over time (in milliseconds, logarithmic scale) comparing the change in surface tension over time for Ink B (WHS-2422-46-1), Ink C (WHS-2422-46-7), and Inks D (WHS-2422-46-2 thru 6). The formulation of these inks is given in Table 1. FIG. 1 shows the functionality of several inks over time spans which are typically greater than the time to eject and then form an ink droplet. Nonetheless, the rate of surface tension reduction is representative of the physical characteristics of each of the inks as they relate to surface tension reduction during ejection and formation of ink droplets.

TABLE 1

Figure 2:
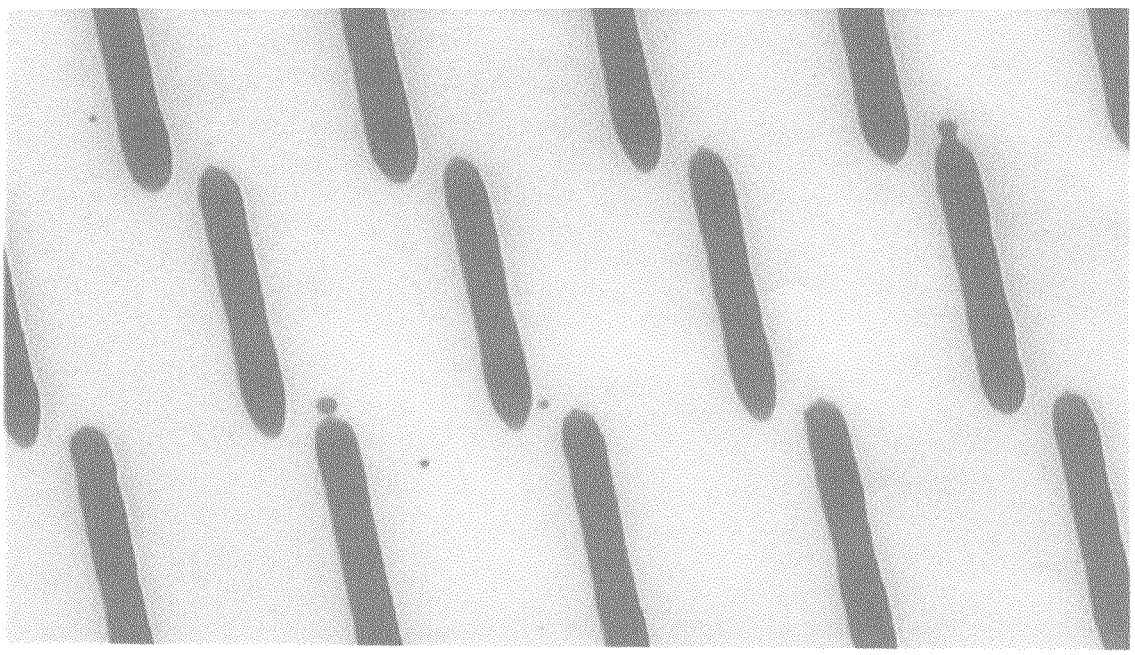
FIG. 2 is an illustration of ink drops printed with Ink A, Table 1, which contains a surfactant, specifically, 0.5% lecithin, and wherein the printing occurred at a temperature of 55 C, and 25 thousands of drops per second (khz)
Figure 3:
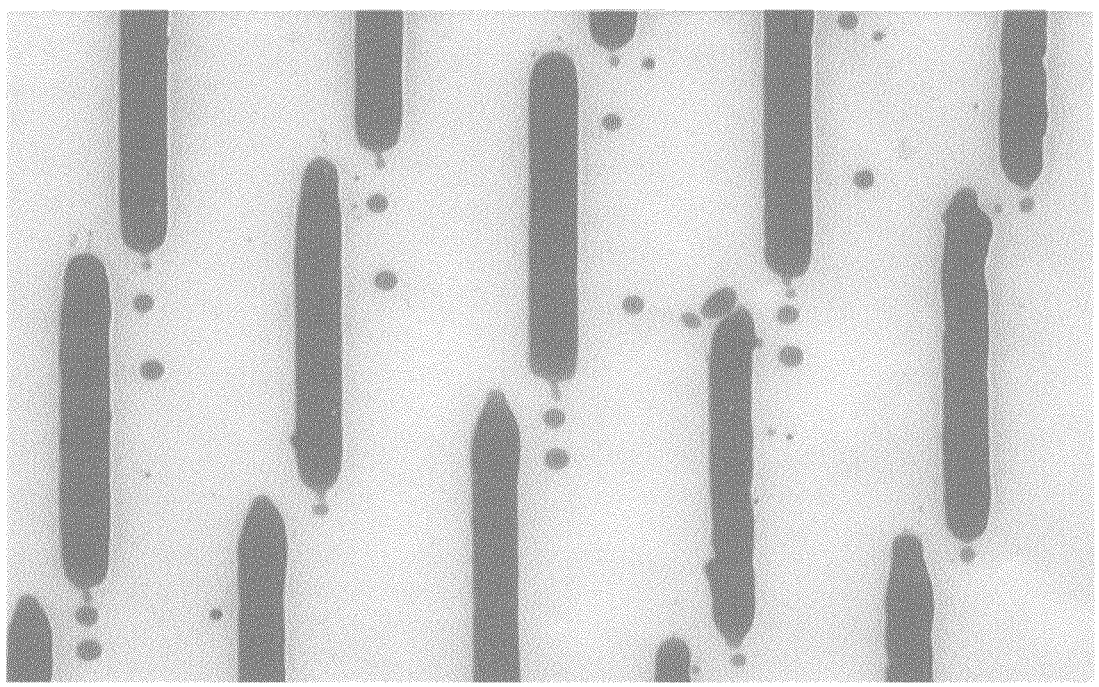
FIG. 3 is an illustration of ink drops printed with Ink B, Table 1, which contains no surfactant, and wherein the printing occurred at a temperature of 55 C, and 25 thousands of drops per second (khz).

Composition of Inks Plotted in FIG. 1, and Printed in FIGS. 2 and 3

|  | Ink A | Ink B Control without surfactant (WHS-2422-46-1) | Ink C (WHS-2422-46-7) | Ink D (WHS-2422-46-2 thru 6) |
|---|---|---|---|---|
| Propylene Glycol | 93.1% | 93.6% | 93.4% | 93.1-91.1% |
| FD&C Blue #1 dye | 1.4% | 1.4% | 1.4% | 1.4% |
| Lecithin (ADM Ultralec P, de-oiled/powdered) | 0.5% | — | 0.2 | — |
| Polysorbate 80 | — | — | — | See Table 2 |
| Glycerin | 4.0% | 4.0% | 4.0% | 4.0% |
| Iso Propyl Alcohol | 1.0% | 1.0% | 1.0% | 1.0% |

TABLE 2

Average Values and Polysorbate Levels for the Compositions Plotted in FIG. 1

| Ink | % by weight of Polysorbate 80 | Average Contact Angle on Stainless (deg) | Average Surface Tension (mN/m) |
|---|---|---|---|
| WHS-2422-46-1 (Ink w/o surfactant) | 0 | 35.1 | 36.68 |
| WHS-2422-46-5 (Ink with polysorbate) | 0.5 | 33.2 | 34.09 |
| WHS-2422-46-4 (Ink with polysorbate) | 1.0 | 32.9 | 34.38 |
| WHS-2422-46-2 (Ink with polysorbate) | 1.5 | 32.8 | 33.45 |
| WHS-2422-46-3 (Ink with polysorbate) | 2.0 | 31.7 | 32.00 |
| WHS-2422-46-6 (Ink with polysorbate) | 2.5 | 31.3 | 31.03 |
| WHS-2422-46-7 (Ink with lecithin) | 0 | 30.1 | 28.95 |

FIG. 1 is a graphical representation of the surface tension over time of certain ink formulations according to the present invention compared to one control formulation. As can be seen in FIG. 1 Ink C drops the surface tension faster than Ink B, the Control and Ink D. Ink C also enables ink jetting without significant satellites formation and at jetting frequencies of up to at least 80 KHz versus the Ink B-Control which cannot be jetted at frequencies above 20 to 25 KHz, and which results in satellites formation at various jetting frequencies. Although Ink D also reduces satellites formation in comparison to Ink B, it does not reduce them as much as Ink C.

Equilibrium surface tension testing is conducted by the Wilhelmy plate method (in this case on a Kruss Processor Tensiometer K12. Dynamic surface tension testing is determined using Kruss Bubble Pressure Tensiometer BP2. The principle of bubble pressure tensiometry is that gas (usually air or nitrogen) is blown through a small capillary tube which has one end submersed in the liquid to be tested and the other end attached to a pressure transducer. The gas forms bubbles in the liquid which initially grow on the end of the capillary, and eventually reach a volume at which they detach. The maximum pressure is reached when the bubble is a hemisphere on the capillary, with a radius equal to the radius of the capillary tip. In selecting a surfactant for a specific application, it is preferred that the reduction in surface tension in mN/m (or dyne/cm) within 1000 milliseconds be of 2 mN/m, preferably 3 mN/m, more preferably 4 mN/m, yet more preferably 6 mN/m, and most preferably 8 mN/m. Another important aspect relates to the ability of the surfactant to affect the visco-elasticity of the ink as it is ejected from the nozzle. As ink is ejected a thin long ink ligament is formed that will eventually rearrange itself to form a droplet. An ink with sufficient visco-elasticity (e.g., extensional viscosity) can withstand the ejection process and form uniform droplets. Not having sufficient visco-elasticity can lead to this ink ligament to split before it can rearrange itself to form a unique droplet, and lead to multiple droplets, wherein one may be considered the main droplet if it is of sufficient size and the rest being satellites. Yet another important aspect in the selection of a surfactant is its ability to maintain the ink comprising such surfactant in liquid and flowable state at room temperature (e.g., about 25 C) without solid surfactant particles or agglomerates. This is important because accidental solidification of an ink within a print head is undesirable, as it can lead to malfunction or damage to the print head.

Different ink jet technologies, like drop-on-demand thermal bubble ink jet (DOD-TIJ), drop-on-demand piezoelectric ink jet (DOD-PIJ), and continuous ink jet (CIJ), require different operation requirements and ink compatibility with the print head. The substrate to be printed, which may be a food product, also has requirements for ink compatibility with the product and process, image quality and, in relation to its manufacture, the speed of image application. All of the above requirements make it difficult to find ink that fits all criteria.

DOD-PIJ technology ejects ink droplets on demand, and does not require a gutter. It also enjoys a large print head life of at least 2 liter/nozzle or 250 to 500 liters of ink per print head, and print heads, each with hundreds of nozzles, are more affordable. PIJ technology works by moving a diaphragm that supports the ink cavity behind the nozzle. Such a diaphragm is made to move by activating a piezoelectric material located behind the diaphragm, via an electric current. The piezoelectric material can be made to displace the diaphragm in various ways or modes, like bending, pushing or shearing. Previously, the jetting frequency for DOD-PIJ had been limited to about 20 KHz, which is slow for high volume food manufacturing systems; e.g., those operating at 50 ft/min or higher.

Until now, however, DOD-PIJ has not been demonstrated to operate above 20 kHz reliably for readable images. The need for the ink in the DOD-PIJ technology to re-establish the meniscus at the nozzle after each droplet is ejected is an important difference versus CIJ (Continuous Ink Jet). The re-establishment of the meniscus at the print head nozzle is very important. In such re-establishment, the meniscus from one print head nozzle is formed after a prior ink droplet is pushed out of the nozzle. Without the proper meniscus formation, ink "weeping" can occur; i.e., dripping or seepage of the ink out of the print head without control, or mis-formation of subsequent droplets. Such weeping can lead to undesirable satellite formation in an image, and/or mis-firing of a nozzle which can result in a non-printed area within an image.

The inks of the present invention enable this DOD-PIJ technology to print inks that are edible at jetting frequencies of up to at least 80 KHz, doubling the prior speeds, while retaining print image quality.

The DOD-PIJ technology cannot use the water-based edible inks of DOD-TIJ technology because these fall outside the main ink specifications for DOD-PIJ print heads. Such water-based inks are composed of water as the main carrier for a food dye. Water has a very low viscosity and leads to a final ink viscosity for these water-based inks of <5 centipoise (cp), versus a requirement for DOD-PIJ print heads ranging from between about 8 to about 20 cp.

Also, water possesses a high surface tension of about 72 dyne/cm versus the required or ideal surface tension for DOD-PIJ print heads of between about 24 to about 50 dyn/cm and preferably about 28 to about 32 dyne/cm. If the surface tension of a food-grade dye (e.g., nearly any aqueous-based dye) is above this ideal range, the printing surface of a print head nozzle will not properly wet and will result in poor placement (i.e., spread) of the ink onto a substrate thereby causing poor print quality. This poor print quality can quickly lead to unreadable images and/or text and also to poor image registration.

Also, if it were to be below the required range, it would not form uniform droplets. Furthermore, substantial amounts of water in ink could cause issue for print head life and jetting performance. This is because piezo ceramic membrane is directly in contact with ink fluid and water can damage the diaphragm by interfering with the adhesives that retain the diaphragm in place, leading to the failure of the specific nozzle involved.

Propylene Glycol (PG) is a suitable base for the edible inks of the present invention for use with DOD-PIJ print heads, since it provides for the base requirements of surface tension (~40 dyns/cm), and acts as the carrier of the food colors or dyes.

Glycerin is another suitable co-solvent for the edible inks of the present invention for use with DOD-PIJ print head, since it provides a large flexibility of viscosity adjustment at various temperatures (viscosity range from 1490 cps to 147 cps from 20 c to 70 c). Use of glycerin as a viscosity enhancer (1490-147 cps/20-70 c) in combination with propylene glycol (58.1 cps at 20 c).

Food colors are used in present invention. This includes, but not limited to dyes, natural colorants and pigments. However, dyes are typically desirable because dyes typically are salts of sulfuric or carboxylic acids, making them soluble. Since they are soluble, they are ideal for jet printing applications, but they do not provide the resistance characteristics that are desired for packaging applications. Pigments, unlike dyes, are colorants that are insoluble in water and most solvents. Dispersion of pigments into ink (as related to DOD-PIJ ink jets) has been a challenge due to their limitation on solvent selection for edible inks and requirements on particle size reduction.

Optionally a food dye may be pre-dissolved first into water and then incorporated as a water-dye solution into the propylene glycol (PG), since at least some food dyes do not incorporate into PG as readily as they do in water. If water is used to pre-dissolve the food dye, the minimum amount of water will be used to minimize the impact of water on reducing final ink viscosity and minimize any increase in surface tension, both of which impact jetting performance. Also, as noted earlier, the least amount of water is desirable to minimize any interference of the water with the adhesives of the diaphragm. In one embodiment, food dye is pre-dissolved in water at the maximum solubility of the dye in water, and this solution is incorporated into the PG base in sufficient amount to load the required level of dye desired. In another embodiment, a solution of 20% food dye with 80% water is formed and added to the PG base at 2%. The level of water or moisture in the final ink is preferred to be less than 50% by weight, more preferably less than 35% by weight, even more preferably less than 20% by weight, yet more preferably less than 10% by weight and most preferably less than 5% by weight. Higher levels of water are possible but that can reduce print head life by weakening the bonding material used as adhesives of the diaphragm.

Commercially available dyes and pigments used in ink formulation, however, can result in ink aggregation, ink crystal growth and nozzle blockage during and after jetting. To minimize and control these issues the dyes are purified to a low salt level, such as level of sulfate content of less than 50 ppm (parts per million).

The level of pH is also controlled to the range of 4 to 10, preferably 5 to 8, which may prevent the crystal formation of the salt at low pH. In addition, some dye shades are pH sensitive, with too broad a range of pH and can lead to change of the color shade from the original design. Too high of pH is also a limitation for the dye solubility and can lead to a dye becoming insoluble and precipitate out of the solution.

The above ink has been used as a common base for DOD-PIJ inks. Neither this ink base nor others for DOD-PIJ have been able to jet at frequencies above 20 KHz, and certainly not as high as 80 kHz, which is a severe limitation for the purposes of printing of the substrates herein. Surprisingly, the novel addition of an edible surfactant enables jetting up to at least 80 KHz while importantly retaining droplet integrity and, as a result, image quality. Furthermore, the addition of an edible surfactant also enables the delivery of a more consistent droplet velocity profile across the spectrum of jetting frequencies.

A preferred droplet velocity is of at least 5 meters/second (m/s), and preferably 8 m/s. Without the addition of the edible surfactant, the droplet velocity for portions of the jetting frequency spectrum may fall below 5 m/s (e.g. 3 to 4 m/s between 14 and 17 KHz) that is inconsistent with other portions of the jetting frequency spectrum and can result in loss of image quality. This is relevant to printing of images because even if an image is printed at a maximum jetting frequency of 20 KHz, that does not mean that all nozzles are jetting all the time 20,000 times per second, unless what is being printed is a strip. More likely what is being printed requires some nozzles to jet at either none, some or all of the 20,000 opportunities to jet in any given second. If for that 1 second a nozzle jets only 5,000 times out of 20,000 possible times, it is said that the % duty load during that time is of 5,000/20,000=25%.

Most likely a given nozzle will be required to jet only some of the time, as a function of the portion of the image that the specific nozzle is required to print. As such, the actual jetting frequency of a given nozzle may constantly vary between subsequent jettings, and result in different droplet velocities for different jettings. If the droplet velocity profile is not consistent and has portions where the velocity is less than desired, image quality loss can result. These inconsistencies in the droplet velocity profile can occur as a result of the meniscus fluctuations at the nozzle post jetting, and what the meniscus shape is at the time of a subsequent jetting. Having a more consistent droplet velocity profile is, therefore, very desirable to maintain image quality even if the maximum jetting frequency used is not above the maximum generally attained in DOD-PIJ prior to the inks of the present invention.

The ability to jet at jetting frequencies above 20 KHz enables the possibility to increase resolution of a printed image at a given substrate speed (e.g. speed at which substrate moves under print head), or conversely, increase the substrate speed at a given resolution (DPI, dots per inch). The increase in jetting frequency can also be used to both partly increase the resolution of a printed image and increase the speed at which the substrate (e.g. dough sheet) moves under the print head.

Surfactants have been commonly used in aqueous based ink formulations to reduce the surface tension of inks, which provides for better wetting and a reduction of the ink flow resistance. Inks with good wetting ability are able to display a plug flow velocity profile through a pipe or nozzle, wherein, the velocity of the ink close to the walls of the pipe is similar to that of the ink at the center of pipe. Inks with poor wetting, display a more dissimilar velocity profile, wherein the velocity of the ink close to the walls is much lower than that at the center of the pipe. In this case, such dissimilar velocity profile could lead to ink being left behind, to blockage of the pipe or nozzle, and to impacting the formation of current or future droplets. One particular defect that could be observed is the formation of satellite droplets.

Satellite droplets may be formed in two ways. In a first way, satellite droplets result when in the process of ejecting one droplet, the droplet does not clear the nozzle appropriately, and does not form a clean droplet, but rather, a main droplet is formed with one or more smaller satellite droplets formed in near proximity to the main droplet. In another way, satellites form when a droplet in mid-flight from the nozzle to the substrate deforms into two or more droplets in addition to the main droplet released from the nozzle.

As noted above, the result of satellite formation often leads to ghost images, wherein the main droplets form the basis of the desired image but the satellite droplets form the basis of the ghost image. Please note that for purposes herein, a ghost image is one that is unintended by the operator. One of skill in the art will recognize however that a trained operator could produce intended double or multi-images that are not themselves formed from unintended satellites. The ghost image would appear as a copy of the desired image but perhaps lighter in color and shifted in a given direction. These ghost images lead to poor image quality and, in the case of text and/or fine image detail, to poor readability.

Furthermore, the inks of the present invention also have a more consistent droplet velocity profile at a given jetting frequency across the spectrum of jetting frequencies resulting in a uniform droplet velocity with far fewer, if any, satellites formed. In addition, as compared to conventional edible ink (i.e., an aqueous-based, non-surfactant containing), present invention also have an improvement for a quick jet recovery from air bubble or particle blockage to increase printing nozzle usage, as well as advantage for increased dye color density without increase dpi.

The location of the print head above the substrate can further accentuate poor readability issues or minimize them. In general, the print head is located in as near proximity to the substrate as possible (e.g., less than 5 mm) to minimize the distance that ink droplets have to travel to reach the substrate. If the travel distance is large, then any deviations from a straight path of jetting between nozzle and substrate will be magnified. Satellites, for example, may end up in the substrate further apart from their corresponding main droplets than if the travel distance would be shorter.

Also, if ink is not cleared from a nozzle appropriately after a jetting, it may interfere with the appropriate jetting of subsequent ink droplets and cause their path to deviate from the intended straight line. Both of these issues can contribute to image blurriness as the travel distance increases. When printing on foods, however, this proximity can expose the print head to an environment that can result in printing reliability losses and other problems.

For example, when the substrate being printed is a dough sheet comprising water and starch, wherein the dough is mixed, sheeted and transported, moisture continuously evaporates from the dough sheet and creates a very humid environment over the dough sheet. Water condensation on the print head from this environment can interfere with ink jetting from the nozzles. Furthermore, dough pieces may remain over the dough sheet even after the formation of the sheet that could collide with the print head and lead to blockage of print head nozzles.

The use of the surfactants of the present invention, enables the location of the print head at a greater distance from the substrate (e.g. over 5 mm, like 10 or 20 mm), since satellites are avoided. This greater distance can avoid the collision of foreign matter riding over the dough sheet with the print head. Furthermore, the use of the surfactants of the present invention also results in the jetting from each nozzle that remain straight, and thus minimizing blurriness versus inks compositions not containing the surfactants of this invention. One way to measure blurriness is to print one line of droplets and measure its width. Ideally the width of the line will be the same as the width of one droplet in the substrate.

Table 3 shows the width (microns, $\mu$) of one line of droplets jetted with Ink A comprising the surfactant of this invention and of Ink B-Control being the same ink as Ink A without the surfactant, at various distances between the print head and the substrate. It show how the Ink A comprising the surfactant of the present invention delivers a more defined line than the Ink B-Control as the distance between print head and substrate increases.

FIG. 2 is an illustration of ink drops printed with Ink A, Table 1, which contains a surfactant, specifically, 0.5% lecithin, and wherein the printing occurred at a temperature of 55 c, and 25 thousands of drops per second (khz); and FIG. 3 is an illustration of ink drops printed with Ink B-Control, Table 1, which contains no surfactant, and wherein the printing occurred at a temperature of 55 c, and 25 thousands of drops per second (khz).

TABLE 3

Width of one line of the droplets shown in FIGS. 2 and 3

| Distance between print head and substrate, mm | Ink A See Table 1, and FIG. 2 | Ink B See Table 1, and FIG. 3 |
| --- | --- | --- |
| 3 | 312$\mu$ | 330$\mu$ |
| 6 | 358$\mu$ | 393$\mu$ |
| 10 | 418$\mu$ | 493$\mu$ |
| 15 | 424$\mu$ | 516$\mu$ |
| 20 | 480$\mu$ | 749$\mu$ |

Another requirement for the inks of the present invention is related to how the ink needs to behave upon contact with the substrate (e.g. dough sheet) and during further processing of the food product. This is particularly important when the printed substrate is subject to further processing like cooking (e.g. baking or frying) that may jeopardize the intergrity of the ink, or image quality. The inks of the present invention set on the surface of the food substrate upon disposing, thus avoiding smearing of the image upon contact with the consumer fingers, and are able to withstand the high temperature associated with the typical cooking steps ranging from about 150 C to about 210 C.

Preparation of an ink involves combination of all ingredients and mixing for sufficient time to achieve a uniform dispersion. The mix time will vary with the equipment used from a few seconds to up to 1 hour. High shear mixers can also be used with care to not inducing an excessive amount of foam during mixing. The ink is filtered through a filter membrane with a porous size of less than about 5 micrometers, preferably less than 0.2 micrometers. Preheating the surfactant and main ink carrier to a temperature above the melting temperature of the surfactant, particularly for high viscosity surfactants, can further ease incorporation of the surfactant into the ink.

Although the present disclosure is discussed mainly in terms of application of the new inks to edible substrates via DOD-PIJ, it is to be understood that application of these new inks to non-edible substrates are also within the scope of the present invention, and that such applications could also benefit from the much higher jetting frequencies.

EXAMPLES

Example 1

In one embodiment of the present invention, an ink is prepared by dissolving FD&C Red #40 dye in water to a concentration 20 g/100 mL of water. This water-dye solution is combined with other ingredients per the following table:

| Ingredient | % by weight of ink |
| --- | --- |
| Water-dye solution (per above) | 8.4% |
| Propylene Glycol | 91.1% |
| Lecithin (ADM Ultralec P, de-oiled/powdered) | 0.5% |

Example 2

In one embodiment of the present invention, an ink is prepared by dissolving FD&C Blue #1 dye and FD&C Red #40 dye in water to a concentration of 10 g/100 mL of water and 15 g/100 mL of water, respectively. This water-dye solution is combined with other ingredients per the following table:

| Ingredient | % by weight of ink |
| --- | --- |
| Water-dye solution (per above) | 6.0% |
| Propylene Glycol | 93.8% |
| Lecithin (Central Soya Precept 8160) | 0.2% |

Example 3

In one embodiment of the present invention, an ink is prepared by dissolving FD&C Green #3 dye in water to a concentration 20 g/100 mL of water. This water-dye solution is combined with other ingredients per the following table:

| Ingredient | % by weight of ink |
| --- | --- |
| Water-dye solution (per above) | 10.0% |
| Propylene Glycol | 83.0% |
| Lecithin (ADM Yelkin TS, liquid) | 1.0 |
| Glycerin | 6.0% |

Example 4

In one embodiment of the present invention, an ink is prepared by dissolving FD&C Red #40 dye in water to a concentration 20 g/100 mL of water. This water-dye solution is combined with other ingredients per the following table:

| Ingredient | % by weight of ink |
| --- | --- |
| Water-dye solution (per above) | 8.4% |
| Propylene Glycol | 84.6% |
| Polysorbate 65 | 3.0% |
| Glycerin | 4.0% |

Example 5

In one embodiment of the present invention, an ink is prepared by dissolving FD&C Blue #1 dye in water to a concentration 18 g/100 mL of water. This water-dye solution is combined with other ingredients per the following table:

| Ingredient | % by weight of ink |
| --- | --- |
| Water-dye solution (per above) | 6.6% |
| Propylene Glycol | 84.9% |
| Lecithin (ADM Ultralec P, de-oiled/powdered) | 0.5% |
| Glycerin | 6.0% |
| Iso-Propyl Alcohol | 2.0% |

Example 6

In one embodiment of the present invention, an ink is prepared by combining the ingredients per the following table:

| Ingredient | % by weight of ink |
| --- | --- |
| FD&C Blue #1 dye | 1.4% |
| Propylene Glycol | 92.4% |
| Lecithin (ADM Ultralec P, de-oiled/powdered) | 0.2% |
| Glycerin | 4.0% |
| Iso-Propyl Alcohol | 2.0% |

Example 7

In one embodiment of the present invention, an ink is prepared by combining the ingredients per the following table:

| Ingredient | % by weight of ink |
| --- | --- |
| FD&C Yellow #5 dye | 0.6% |
| FD&C Blue #1 dye | 0.2% |
| FD&C Red #40 dye | 0.6% |
| Propylene Glycol | 92.6% |
| Lecithin (ADM Ultralec P, de-oiled/powdered) | 0.2% |
| Glycerin | 4.0% |
| Iso-Propyl Alcohol | 2.0% |

Example 8

In one embodiment of the present invention, an ink is prepared by dissolving FD&C Red #40 dye in water to a concentration 20 g/100 mL of water. This water-dye solution is combined with other ingredients per the following table:

| Ingredient | % by weight of ink |
| --- | --- |
| Water-dye solution (per above) | 8.4% |
| Propylene Glycol | 85.1% |
| Lecithin (Central Soya Precept 8160) | 0.5% |
| Glycerin | 5.0% |
| Methyl Paraben | 0.5% |
| Propyl Paraben | 0.5% |

Example 9

In one embodiment of the present invention, an ink is prepared by dissolving FD&C Red #40 dye in water to a concentration 20 g/100 mL of water. This water-dye solution is combined with other ingredients per the following table:

| Ingredient | % by weight of ink |
| --- | --- |
| Water-dye solution (per above) | 8.4% |
| Propylene Glycol | 90.6% |
| Lecithin (ADM Ultralec P, de-oiled/powdered) | 0.5% |
| Sorbitan Mono-Stearate | 0.5% |

Example 10

In one embodiment of the present invention, an ink is prepared by dissolving FD&C Red #40 dye in water to a concentration 20 g/100 mL of water. This water-dye solution is combined with other ingredients per the following table:

| Ingredient | % by weight of ink |
| --- | --- |
| Water-dye solution (per above) | 8.4% |
| Propylene Glycol | 88.6% |
| Lecithin (ADM Ultralec P, de-oiled/powdered) | 0.5% |
| Polysorbate 65 | 2.5% |

Example 11

One ink of the Examples 1 through 10 is used in a DOD-PIJ print head at a temperature of 55 C. The print head is located 2 mm over a moving dough sheet to print the dough sheet with a resolution of 203 dpi (dots per inch).

Example 12

The printed dough sheet of Example 11 is further fried in oil at a temperature of 200 C.

Example 13

One ink of the Examples 1 through 10 is used in a DOD-PIJ print head at a temperature of 55 C. The print head is located between 5-10 mm over a moving cooked snack to print the cooked snack with a resolution of 203 dpi (dots per inch).

Examples 14 and 15

Caramel, which is a natural colorant, is used to form brown colored inks (brown) are formulated according to the formulae in the table below.

| Caramel Brown Formula Ingredient | Example 14 % | Example 15 % | Range |
| --- | --- | --- | --- |
| Caramel color | 25 | 35 | 5-80% |
| Propolyene glycol | 41.75 | 27 | 30-90% |
| Glycerine | 4 | 0 | 0-10% |
| Potassium Citrate | 2 | 2.5 | less than 5% |
| Purified water | 25 | 35 | less than 50% |
| Potassium Hydroxide | 2 | 0 | less than 2% |
| Surfactant (Ultralec P) | 0.25 | 0.5 | 0.1 to 5% |
| Total | 100 | 100 | 100% |

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A method for printing readable images onto an edible substrate using a drop on demand piezo-electric printer comprising:
   a) positioning the substrate onto a high speed processing line at a speed of at least 50 ft./min.;
   b) delivering the substrate to an ink jet printing station;
   c) printing an ink onto the substrate to form a readable image, wherein the ink comprises a carrier comprising from 83 to 93.8 wt % propylene glycol and optionally glycerin, at least one edible surfactant comprising a lecithin-based surfactant, and less than about 5% wt % water;
   d) transferring the substrate to a cooking device; and
   e) cooking the substrate.

2. The method of claim 1 wherein the ink further comprises an edible colorant.

3. The method of claim 1 wherein the average surface tension of the ink is from about 24 mN/m to about 44 mN/m.

4. A method for printing readable images on snack chips, comprising:
   a) delivering a snack chip substrate to an ink jet printing device on a high speed processing line at a speed of at least 50 ft/min.;
   b) printing readable images on the substrate using an edible ink comprising a carrier comprising from 83 to 93.8 wt % propylene glycol, at least one surfactant comprising a lethicin-based surfactant, and less than about 10 wt % water, wherein satellite formation represents less than about 30% of the total printed area of a given snack chip;
   c) transferring the substrate to a cooking device; and
   d) cooking the substrate.

5. The method of claim 4 wherein said edible ink comprises less than about 5 wt % water.

6. The method of claim 4 wherein said edible ink further comprises a viscosity modifier comprising glycerin.

7. The method of claim 4 wherein the average surface tension of the edible ink is from about 24 mN/m to about 44 mN/m.

8. The method of claim 4 wherein satellite formation of the edible ink represents less than about 20% of the total printed area of a given snack chip.

9. The method of claim 4 wherein satellite formation of the edible ink represents less than about 10% of the total printed area of a given snack chip.

10. The method of claim 4 wherein satellite formation of the edible ink represents less than about 5% of the total printed area of a given snack chip.

11. A method for printing readable images on snack chips, comprising:
   a) delivering a snack chip substrate to an ink jet printing device on a high speed processing line;
   b) printing readable images on the substrate using an edible ink having a pH in the range of 5 to 8 and comprising dye purified to a sulfate level of less than 50 parts per million, a carrier comprising from 83 to 93.8 wt % propylene glycol, at least one surfactant comprising a lethicin-based surfactant, and less than about 10 wt % water;
   c) delivering said printed substrate to a high temperature cooking device; and
   d) cooking said substrate.

* * * * *